UNITED STATES PATENT OFFICE 2,450,039

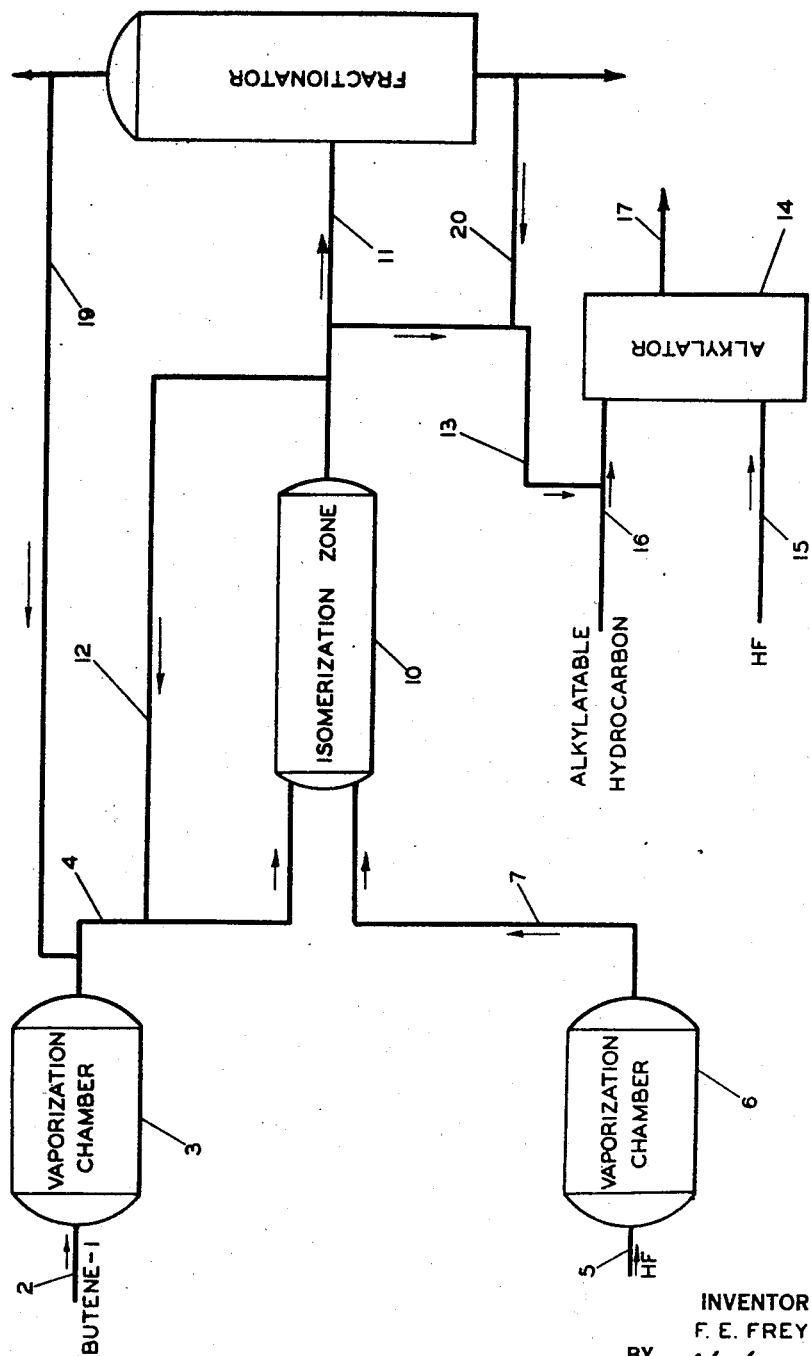

ISOMERIZATION PROCESS

Frederick E. Frey, Bartlesville, Okla., assignor to Phillips Petroleum Company, a corporation of Delaware Application May 12, 1945, Serial No. 593,464

8 Claims. (Cl. 260—683.2)

This invention relates to the catalytic isomerization of olefinic hydrocarbons, and in one specific aspect to an improved process for the conversion of alpha olefins to beta olefins. In another specific aspect the present invention relates to a combined isomerization and alkylation process in which selected olefinic hydrocarbons are catalytically isomerized to form an isomeric olefin more suitable for alkylation, and the isomerized material is then alkylated using the same catalyst for this purpose.

Alpha olefins, generally referred to as 1-olefins, may undergo an isomerization reaction in which the unsaturated linkage migrates toward the center of the carbon chain with the formation of beta or 2-olefins. In the normal butenes, this reaction may be represented by the equation

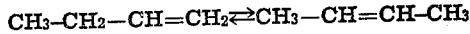

$$CH_3-CH_2-CH=CH_2 \rightleftarrows CH_3-CH=CH-CH_3$$

The alpha and beta olefins are identical in many chemical properties but differ rather widely in some physical characteristics. The 1-olefins, for example, are lower boiling than the 2-olefins or the correspondeing paraffins. It has further been found that the alkylation products formed by alkylation of low boiling isoparaffins with the 2-olefins such as butene-2 or pentene-2 possess higher octane numbers than those obtained from the corresponding 1-olefins.

The reaction which converts alpha olefins to beta olefins has been found to be of the time-equilibrium type. In other words, butene-1, for example, is gradually converted into butene-2 or vice versa, until the concentrations of the components reach equilibrium values.

Various catalysts have been proposed for this reaction but in general the more active catalysts concurrently promote side reactions such as polymerization while the less active catalysts require excessive temperatures to reach equilibrium values with resultant low beta olefin concentrations. Catalysts previously utilized have been in solid or liquid form and the desirability of a vapor phase catalyst, particularly where both product and catalyst may be utilized in a subsequent reaction, is apparent.

It is an object of the present invention to cause shifting of a double bond in an unsaturated compound by the use of substantially anhydrous hydrogen fluoride as a catalyst. It is a further object of the present invention to isomerize alpha olefins to beta olefins in the presence of hydrogen fluoride vapors. It is a still further object of the present invention to isomerize lower boiling 1-olefins to 2-olefins in the presence of hydrogen fluoride as a catalyst and to utilize the 2-olefin formed thereby to alkylate a low boiling paraffin hydrocarbon in the presence of hydrogen fluoride as a catalyst in order to produce an alkylate of improved octane number. It is another object of the present invention to cause shifting of the double bond in 2-olefins to form 1-olefins. Further objects will be apparent from the disclosure contained herein.

According to this invention, olefins are isomerized, without change in the carbon skeleton of the olefin molecule, by the action of anhydrous hydrofluoric acid at elevated temperatures. More specifically, a high yield of butene-2 is obtained by passing butene-1 together with a minor proportion of anhydrous hydrofluoric acid, in the vapor phase, through an isomerization zone maintained at an elevated temperature. Although the reaction mechanism is not entirely understood, the following reactions probably occur:

(1) 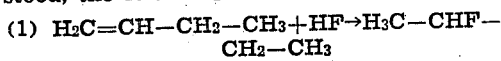 $H_2C=CH-CH_2-CH_3 + HF \rightarrow H_3C-CHF-CH_2-CH_3$ (2) 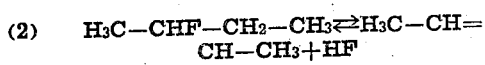 $H_3C-CHF-CH_2-CH_3 \rightleftarrows H_3C-CH=CH-CH_3 + HF$ In the accompanying drawing, which is a schematic flow diagram of a preferred mode of practicing the invention, a hydrocarbon feed comprising butene-1 in relatively high proportion in comparison with any butene-2 enters vaporization chamber 3 through line 2 and is completely vaporized. In like manner, substantially anhydrous hydrofluoric acid enters vaporization chamber 6 through line 5 and is completely vaporized. Separate vaporization chambers, as shown, are preferred to a single, common vaporization chamber because the presence of both an olefin and hydrofluoric acid in liquid state promotes polymerization of the olefin. Hydrocarbon and hydrofluoric acid vapors are passed, through conduits 4 and 7, respectively, to isomerization zone 10. The relative flow rates of the two vapor streams are preferably so adjusted that approximately 5 to 20 moles of butene-1 or other olefin per mole of hydrofluoric acid enter isomerization zone 10. Satisfactory conditions in isomerization zone 10 are: temperature, 300 to 1000 F., preferably 500 to 700 F.; pressure, 20 to 200 p. s. i., preferably 50 to 100 p. s. i.; reaction time, 5 to 50 minutes, preferably 10 to 15 minutes. Other conditions sometimes may be used; for example, the pressure sometimes may be higher than the range indicated, but ordinarily an excessively high pressure is best avoided, inasmuch as a high pressure promotes formation of heavy polymers, which in the present process are not desired. However, formation of some light or medium polymers may be tolerated and, in some cases, may contribute to the specific quality of the end product as when the isomerizate is utilized for alkylation of an alkylatable hydrocarbon.

The isomerizate, which comprises butene-2, butene-1, and small proportions of polymeric material, butyl fluoride and hydrofluoric acid, may be withdrawn through outlet 11; however, to aid in controlling the conditions, part of this product may be recycled to isomerization zone 10, as through recycle conduit 12. If desired, the components of the product withdrawn through outlet 11 may be separated by fractionator 18 and the hydrofluoric acid, the original olefin, and any undesired butyl fluoride may be returned to isomerization zone 10 by line 19. Preferably, however, to take advantage of the presence of hydrofluoric acid and to take advantage of the exceptional suitability of the resultant butene-2 as an alkylating agent, this isomerization product is passed through conduit 13 to hydrofluoric acid alkylation that occurs in alkylator 14. The requisite additional hydrofluoric acid and alkylatable hydrocarbon, preferably a low-boiling isoparaffin such as isobutane, are introduced through inlets 15 and 16, respectively, and the reaction mixture is withdrawn through outlet 17 and is thereafter treated in conventional means, not shown. If desired the butene-2 separated in 18 may be passed into the alkylation unit via line 20. Suitable valves, not shown, may be utilized to control flow in the various lines as desired.

In the alkylation zone the reaction is carried out under conditions known to the art to produce isoparaffins. In general liquid phase conditions are maintained under suitable pressure; and for alkylation of isobutane with butene-2 at temperatures of 30–140 F., an external isobutane-butene-2 ratio of from 3 to 1 to 20 to 1 is desirable. The vapor phase products from the isomerization zone are, therefore, liquefied before being introduced into the alkylation zone, either before or after admixture with isobutane and additional hydrogen fluoride.

The invention is not limited to the isomerization of butene-1, but is generally applicable to isomerization of olefins having more than three carbon atoms per molecule, particularly those having double bonds attached to terminal carbon atoms, for example pentene-1 and hexene-1, etc. The olefin to be isomerized may be substantially pure or it may be in a mixture with materials that undergo substantially no carbon-skeletal changes under the isomerization conditions; for example, such a mixture may comprise isobutylene or similar branched olefin. The present invention is particularly applicable to olefin chains having 4 to 8 carbon atoms.

EXAMPLE I

In a group of runs, butene-1 and anhydrous hydrofluoric acid were passed, in the vapor phase, through a steel tube maintained at elevated temperatures. The effluents from the tube were collected over water and analyzed. The conditions and the results are given in Table I.

TABLE I
*Hydrofluoric acid isomerization of butene-1*

| Run No. | 516 | 518 | 521 | 524 | 530 |
|---|---|---|---|---|---|
| Temp, F. | 392 | 572 | 572 | 576 | 567 |
| Pressure, p. s. i. | 200 | 200 | 200 | 200 | 200 |
| Contact Time, min. | 11.0 | 10.4 | 18.1 | 15.4 | 33.3 |
| Space Velocity, vol per hr. | 5.3 | 5.8 | 3.3 | 3.9 | 1.8 |
| Butene/HF (mol) | 10.3 | 10.2 | 10.4 | (1) | 29 |
| Composition of Effluent, wt. percent: | | | | | |
| Butene-1 | 67.6 | 62.5 | 33.8 | | 29.6 |
| Butene-2 | 20.9 | 35.5 | 57.5 | (2) | 55.1 |
| Butyl Fluoride | 5.7 | 1.4 | 2.1 | | 6.2 |
| Polymer | 5.8 | 0.6 | 6.6 | <0.05 | 9.1 |
| Butene-1 Isomerized, percent | 21.2 | 35.6 | 58.5 | (2) | 56.4 |

¹ HF absent.
² Approximately 1.

Run 524, in which no hydrofluoric acid was used, shows that the catalytic activity was substantially entirely due to the hydrofluoric acid.

EXAMPLE II

Two mixtures of butene-1 and butanes were blended with minor proportions of hydrofluoric acid and passed, in the vapor phase, through a heated stainless steel tube. The effluents were collected over water and analyzed. The conditions and the results are given in Table II.

TABLE II
*Hydrofluoric acid isomerization of butene-1 in mixtures with butanes*

| Run No. | 535 | 539 |
|---|---|---|
| Temp, F. | 572 | 725 |
| Pressure, p. s. i. | 48 | 50 |
| Contact Time, min. | 13.3 | 9.7 |
| Space Velocity, vol per hr. | 4.5 | 5.8 |
| Hydrocarbon/HF (wt.) | 18.2 | 61.5 |
| Composition of Hydrocarbon Feed, wt. percent: | | |
| Butene-1 | 34.4 | 49.2 |
| Butanes | 65.6 | 50.8 |
| Composition of Effluent, wt. percent: | | |
| Butene-1 | 9.6 | 14.4 |
| Butene-2 | 19.0 | 30.5 |
| Butanes | 67.5 | 51.4 |
| Butyl Fluoride | 3.3 | 2.4 |
| Polymer | 0.6 | 1.3 |
| Butene-1 Isomerized, percent | 55.7 | 62.3 |

EXAMPLE III

The isomerizate produced in run No. 539, described in Example II, is blended with sufficient isobutane to give an isobutane-butylene mol ratio of 9. The resultant hydrocarbon mixture is then contacted with an equal volume of anhydrous hydrofluoric acid at 115 F. and a contact time of 17 minutes in liquid phase. The acid phase is separated from the hydrocarbon phase, and the latter is debutanized. The debutanized material is fractionated to remove constituents boiling about 385 F. (approximately 2 volume per cent of the total debutanized material) from the aviation-range alkylate. This alkylate has an ASTM octane rating of 91, which is increased to 101 by the addition of 1 ml. of tetraethyl lead per gallon of alkylate.

The advantage of using such an isomerizate as an alkylating agent is illustrated by the fact that, when isobutane is alkylated with pure butene-1 under the conditions described above, the aviation range alkylate has an ASTM octane rating of 88.7, which is increased to 99.1 by the addition of 1 ml. of tetraethyl lead per gallon.

EXAMPLE IV

Butene-2 and anhydrous HF in a molar ratio of 10 to 1 are passed in the vapor phase through a steel tube maintained at a temperature of 500° F., a pressure of 200 pounds per square inch and a contact time of 12 minutes. The effluent contains approximately 15% butene-1 and the remainder unconverted butene-2, thus approaching equilibrium conditions.

In general, conditions for the isomerization of other olefins may readily be determined and will depend to a large extent on the conditions required to achieve equilibrium and those necessary to avoid extensive side reactions. For the conversion of pentenes and hexenes temperatures within the range of 250–750° F. are generally preferred, since somewhat lower temperatures are desirable for the higher-boiling olefins.

I claim:

1. A process for the isomerization of butene-1 to butene-2 which comprises introducing butene-1 vapor and anhydrous hydrogen fluoride vapor into an isomerization zone in the ratio of about 5 to 20 mols of butene-1 per mol of hydrogen fluoride, at a temperature of 300 to 1000° F. at a contact time of 5 to 50 minutes to effect substantial conversion of said butene-1 to butene-2 in the absence of substantial polymerization and without substantial change in the carbon skeleton of the butene-1 molecule.

2. A process for the isomerization of an olefin having at least four carbon atoms in the chain, by effecting shifting of the double bond, which comprises contacting said olefin with substantially anhydrous hydrogen fluoride at a temperature in the range of about 300–1000° F. and at a contact time of about 5–50 minutes, such that said isomerization without change in the carbon skeleton of the molecule is the predominant reaction.

3. A process according to claim 2 wherein the isomerization is carried out with the olefin and hydrogen fluoride in the vapor phase.

4. A process according to claim 2 wherein the olefin to be isomerized contains a terminal double bond.

5. A process according to claim 4 wherein the isomerization is carried out with the hydrogen fluoride and olefin in the vapor phase.

6. A process according to claim 5 wherein the olefin is butene-1.

7. A process according to claim 2 wherein the olefin to be isomerized is a 2-olefin and wherein the predominant reaction is the formation of the corresponding 1-olefin.

8. A process according to claim 7 wherein the 2-olefin is butene-2.

FREDERICK E. FREY.

REFERENCES CITED

The following references are of record in the file of this patent:

UNITED STATES PATENTS

| Number | Name | Date |
|---|---|---|
| 1,996,115 | Lazier | Apr. 2, 1935 |
| 2,315,078 | Pines | Mar. 30, 1943 |
| 2,317,901 | Frey | Apr. 27, 1943 |
| 2,346,657 | Bloch | Apr. 18, 1944 |
| 2,347,317 | Gibson | Apr. 25, 1944 |
| 2,366,743 | Matuszak | Jan. 9, 1945 |
| 2,377,352 | Mattox | June 5, 1945 |

FOREIGN PATENTS

| Number | Country | Date |
|---|---|---|
| 524,891 | Germany | May 23, 1931 |

OTHER REFERENCES

Gerhold et al., article in Nat. Petrol. News; Mar. 1, 1944; page R146, R148, R150, R151, R154, R155 (R151 pertinent).